(12) United States Patent
Schmidlin et al.

(10) Patent No.: US 12,144,375 B2
(45) Date of Patent: Nov. 19, 2024

(54) ATOMISER FOR USE IN ELECTRONIC CIGARETTE WITH OPTICAL VAPORISATION SYSTEM

(71) Applicant: JT International S.A., Geneva (CH)

(72) Inventors: Moritz Schmidlin, Dietikon (CH); Damir Luso, Schlieren (CH)

(73) Assignee: JT International S.A. (CH)

( * ) Notice: Subject to any disclaimer, the term of this patent is extended or adjusted under 35 U.S.C. 154(b) by 1006 days.

(21) Appl. No.: 16/973,684

(22) PCT Filed: Jun. 14, 2019

(86) PCT No.: PCT/EP2019/065702
§ 371 (c)(1),
(2) Date: Dec. 9, 2020

(87) PCT Pub. No.: WO2020/002006
PCT Pub. Date: Jan. 2, 2020

(65) Prior Publication Data
US 2021/0251292 A1    Aug. 19, 2021

(30) Foreign Application Priority Data

Jun. 26, 2018 (EP) .................................... 18179732

(51) Int. Cl.
*A24F 40/46* (2020.01)
*A24F 7/00* (2006.01)
(Continued)

(52) U.S. Cl.
CPC ................ *A24F 40/46* (2020.01); *A24F 7/00* (2013.01); *A24F 40/42* (2020.01); *A24F 40/48* (2020.01);
(Continued)

(58) Field of Classification Search
CPC .......... A24F 40/46; A24F 40/48; A24F 40/42; A24F 40/10; A24F 7/00; G02B 5/003; G02B 6/4201; H05B 3/0052
See application file for complete search history.

(56) References Cited

U.S. PATENT DOCUMENTS 10,172,390 B2 * 1/2019 Nakano ............... B65B 69/0033
10,555,552 B2 * 2/2020 Batista .................... A61L 9/037
(Continued)

FOREIGN PATENT DOCUMENTS

CA         3021509 A1    10/2017
CN        104643290 A     5/2015
(Continued)

OTHER PUBLICATIONS

International Search Report including Written Opinion for PCT/EP2019/065702 mailed Sep. 26, 2019; 12 pages.
(Continued)

*Primary Examiner* — Thanh Tam T Le
(74) *Attorney, Agent, or Firm* — Lerner David LLP (57) ABSTRACT

An electronic cigarette includes a laser and a replaceable atomiser. A reservoir is provided for storing a vaporisable liquid. The replaceable atomiser includes a light guide, an absorber and a vaporisation chamber. A liquid inlet in the atomiser provides a flow path for liquid in the reservoir to flow towards the absorber and the vaporisation chamber. The light guide is configured to couple light from the laser towards the absorber which can generate heat by absorbing the emitted light and this can cause vaporisation of the vaporisable liquid. When the light guide becomes dirty or contaminated it can be replaced simply by replacing the atomiser.

18 Claims, 9 Drawing Sheets

(51) Int. Cl.
  *A24F 40/42* (2020.01)
  *A24F 40/48* (2020.01)
  *G02B 5/00* (2006.01)
  *G02B 6/42* (2006.01)
  *H05B 3/00* (2006.01)
  *A24F 40/10* (2020.01)

(52) U.S. Cl.
  CPC .......... *G02B 5/003* (2013.01); *G02B 6/4201* (2013.01); *H05B 3/0052* (2013.01); *A24F 40/10* (2020.01)

(56) References Cited

U.S. PATENT DOCUMENTS

| | | | |
|---|---|---|---|
| 10,575,562 B2 * | 3/2020 | Bless | A24F 40/46 |
| 10,617,151 B2 * | 4/2020 | Davis | A24F 40/44 |
| 10,687,557 B2 * | 6/2020 | Tucker | A24F 47/00 |
| 10,721,973 B1 * | 7/2020 | Hermiz | A24F 40/30 |
| 10,798,972 B2 * | 10/2020 | Takeuchi | A24F 40/485 |
| 10,813,386 B1 * | 10/2020 | Bajpai | A24F 1/30 |
| 10,881,144 B2 * | 1/2021 | Batista | A61M 15/06 |
| 10,988,368 B2 * | 4/2021 | Biel | B05B 11/0044 |

FOREIGN PATENT DOCUMENTS

| | | |
|---|---|---|
| CN | 104856235 A | 8/2015 |
| CN | 106343615 A | 1/2017 |
| EP | 3075270 A1 | 10/2016 |
| GB | 2535809 A | 8/2016 |
| KR | 20120103351 A | 9/2012 |
| KR | 20160134582 A | 11/2016 |
| WO | 2013138384 A2 | 9/2013 |
| WO | 2016112579 A1 | 7/2016 |
| WO | 2016150019 A1 | 9/2016 |
| WO | 2016184783 A1 | 11/2016 |
| WO | 2017182554 A1 | 10/2017 |

OTHER PUBLICATIONS

Extended European Search Report including Written Opinion for EP18179732.5 issued Dec. 11, 2018; 7 pages.
Search Report dated Dec. 1, 2023 from the Office Action for Chinese Application No. 201980043149.9 issued Dec. 6, 2023, pp. 1-3. [See pp. 1-2, categorizing the cited references].

* cited by examiner

ATOMISER FOR USE IN ELECTRONIC CIGARETTE WITH OPTICAL VAPORISATION SYSTEM

CROSS-REFERENCE TO RELATED APPLICATIONS

The present application is a national phase entry under 35 U.S.C. § 371 of International Application No. PCT/EP2019/065702, filed Jun. 14, 2019, published in English, which claims priority to European Application No. 18179732.5 filed Jun. 26, 2018, the disclosures of which are incorporated herein by reference.

BACKGROUND OF THE INVENTION

The present invention relates to an atomiser for use in an electronic cigarette in which a vaporisable liquid is vaporised using a light source.

Electronic cigarettes are becoming increasingly popular consumer devices. Some electronic cigarettes are provided with a liquid reservoir that stores vaporisable liquid. A flow path is provided from the liquid reservoir to a vaporiser, which is sometimes referred to as an atomiser. Often an atomiser is provided with an absorber that can absorb liquid from the reservoir and a heating coil that can vaporise the liquid that is received in the absorber. These heating coils are often provided as electrically resistive wires that are wrapped around the absorber.

Another technique for vaporising liquid involves the use of lasers. One technique for this is described in WO 2017/182554. In this arrangement a battery portion includes a laser emitter and a light guide that couples light projected from the laser emitter into the light guide towards a target. The target in this example is formed within a replaceable cartridge and includes a number of absorbers that extend into a liquid reservoir formed within the cartridge.

A problem can arise in these electronic cigarettes after a period of use because it has been found that deposits can form on the light guide and reduce its effectiveness. In addition, light guides are delicate and need to be handled with care to prevent damage to them or to the target absorber.

BRIEF SUMMARY OF THE INVENTION

An object of the present invention is to address and overcome some of these issues.

According to an aspect of the invention there is provided an atomiser for an electronic cigarette, comprising: a housing including at least one air inlet, at least one air outlet and a liquid inlet; a light guide received within the housing; an optical absorber received within the housing; and a vaporisation chamber received within the housing, wherein a liquid flow path is provided from the liquid inlet towards the optical absorber and the vaporisation chamber, and an air flow path is defined from air inlets in the housing to the vaporization chamber, and wherein the light guide is configured to couple light from a vaporising light source towards the optical absorber which can generate heat by absorbing light from the vaporising light source.

In this way, a light guide can be provided within a replaceable atomiser unit. Replacement of the atomiser results in replacement of the light guide, which may be useful if deposits form on its surfaces and obscure, absorb or reflect light from the vaporising light source. Thus, an atomiser can be provided that is consumable or disposable and which includes the light guide.

The light guide can be integrated within the housing, which means that it can be handled easily, e.g. when a replaced new atomiser is installed during atomiser replacement. This can provide protection for a fragile light guide, preventing damage from occurring. The light guide and the optical absorber can be fixed in position relative to one another within the housing which helps to prevent either component from causing damage to the other during handling of the atomiser or assembly of components which engage with the atomiser (e.g. a replacable liquid reservoir or cartridge etc.).

The atomiser is preferably engageable at one end with a first segment of the electronic cigarette which comprises the liquid reservoir so that vaporisable liquid can be received in the liquid inlet. The atomiser is preferably engageable at its other end with a second segment which comprises the vaporising light source and a power source. The first and second segments may be directly engageable with one another in order to secure the replaceable atomiser in a cavity in between.

Preferably the light guide is a solid prism. The solid prismis preferably a solid, elongate body of substantially constant cross section such as a rod of substantially circular cross-section that light from the vaporising light source can propagate within. In this way, the solid prism can transport light from the vaporising light source towards the optical absorber using total internal reflection in some embodiments. The light guide may also homogenise the beam profile from the light source. In an alternative arrangement a light guide may be formed between reflective surfaces in free-air. For example, a light guide may be a mirrored tube. Preferably the light guide has an upper coupling surface and a lower coupling surface, where the lower coupling surface is configured to couple with the light source and the upper coupling surface is configured to couple with the absorber.

Preferably the lower coupling surface is configured to engage with a receiving portion of the vaporising light source. In this way, a reliable and repeatable engagement can be provided between the light guide and the vaporising light source whenever the atomiser is replaced. Collimating optics such as lenses may be provided between the laser and the light guide. In some embodiments the collimating optics may be integrated within the laser or the light guide.

The lower coupling surface may be angled such that it can receive a light beam in a transverse direction and redirect said light beam into an axial direction. This can allow the vaporising light source to be oriented in a transverse direction and to be reflected towards the absorber by the lower coupling surface. This can advantageously improve safety in the electronic cigarette by preventing vaporising light from coming into contact with a user. In an alternative arrangement the light guide may include a flexible portion and a guide slot may be provided for bending the light guide towards the vaporising light source which is arranged to emit radiation in a transverse direction, or at least in a direction that is oriented away from the absorber.

In one arrangement the light guide coupling surface may be formed on a projection that extends from the housing. The vaporising light source, or the package within which it is contained, can include a receiving portion that is sized and shaped to receive the projection. Thus, a plug-fit can be provided between the vaporising light source and the light guide to optimize optical transmission towards the optical absorber.

Preferably the light guide has an axial direction which coincides with an axial direction of the housing. The light guide preferably has an elongate cylindrical shape. Preferably the at least one air outlet is located axially above the optical absorber in the vaporization chamber.

The optical absorber may include, or be provided alongside, a liquid absorber for absorbing vaporisable liquid received in the liquid inlet. In this way, a absorber can be provided that absorbs liquid from the reservoir and light from the vaporising light source. This liquid can be received in the absorber and vaporised when the absorber is heated by light from the vaporising light source. Alternatively, separate liquid and optical absorbers may be provided.

According to another aspect of the invention there is provided a cartridge comprising a liquid store and the atomizer as previously defined. The cartridge preferably includes one or more liquid inlets that provide a liquid flow path from the liquid store to an absorber.

According to another aspect of the invention there is provided an electronic cigarette device comprising a mouthpiece portion and a power supply portion, wherein the mouthpiece portion comprises a liquid store, a receiving portion configured to receive a removable atomizer, and a mouthpiece having a vapor outlet channel, and wherein the power supply portion comprises a power source, and a vaporising light source configured to receive electrical energy from the power source, and wherein the light source is configured to couple light from the vaporising light source to a light guide located within the atomiser.

The liquid store may be a replaceable cartridge which is separate from the mouthpiece and which can therefore be replaced with a different frequency than the mouthpiece (e.g. more frequently if it is disposable or less frequently if it is refillable). Alternatively, the liquid store may be formed integrally with the mouthpiece (again the combined mouthpiece and liquid store may be formed as a replaceable unit—e.g. if the unit includes a sealed liquid store which is not refillable but is disposed of once the liquid store is depleted—or the liquid store may be refillable so that the unit is disposed of only infrequently).

The light source may be housed within a recessed portion of the receiving portion and the light guide may comprise a protruding portion configured to be received within the recessed portion. The mouthpiece portion may comprise at least one circular seal positioned around an internal circumference of the receiving portion.

The atomiser may be configured to engage with first and second segments that respectively comprise the reservoir and the vaporising light source so that the atomiser is received between the first and second segments. Preferably the vaporising light source is a laser.

An airflow channel may be provided between an air inlet and a mouthpiece. The atomiser may be provided in the airflow channel so that vaporised liquid can be inhaled by a user, and the vaporising light source may be provided in or adjacent the airflow channel at a position between the atomiser and the air inlet so that the airflow can be heated by the vaporising light source. In this way, the vaporising light source can pre-heat the airflow before it is received at the atomiser. This can provide an advantageous cooling for the vaporising light source. In addition, it can reduce the amount of energy required to vaporise the vaporisable liquid, since a cooling effect in the vaporisation chamber caused by the airflow is reduced.

According to another aspect of the invention there is provided a method of operating an electronic cigarette, comprising the steps of: providing an atomiser comprising: a housing including at least one air inlet, at least one air outlet and a liquid inlet; a light guide; an optical absorber; and a vaporisation chamber within the housing; providing a vaporising light source and a liquid reservoir separately from the atomiser; providing a flow of vaporisable liquid from the reservoir towards the optical absorber and the vaporisation chamber; providing vaporising light from the vaporising light source; coupling the vaporising light from the vaporising light source towards the optical absorber using the light guide; and absorbing light at the optical absorber in order to generate heat and vaporise the vaporisable liquid. Preferably the method also includes the step of replacing the atomiser.

BRIEF DESCRIPTION OF THE DRAWINGS

Embodiments of the invention are now described, by way of example, with reference to the drawings, in which.

DETAILED DESCRIPTION

As used herein, the term "inhaler" or "electronic cigarette" may include an electronic cigarette configured to deliver an aerosol to a user, including an aerosol for smoking. An aerosol for smoking may refer to an aerosol with particle sizes of 0.5-7 microns. The particle size may be less than 10 or 7 microns. The electronic cigarette may be portable.

With reference to FIGS. 1 to 4, an electronic cigarette 2 and an atomiser 20 according to an embodiment of the present invention is illustrated. The electronic cigarette 2 can be used as a substitute for a conventional cigarette comprising shredded tobacco. As seen in the figures, the electronic cigarette 2 is provided with an elongate main body 3 comprising a mouthpiece portion 3a and a power supply portion 3b 4. The replaceable atomiser 20 is provided at a position between the mouthpiece portion 3a and the power supply portion 3b.

The mouthpiece portion 3a comprises a mouthpiece 6 and a reservoir 8 for storing vaporisable liquid. The vaporisable liquid may comprise propylene glycol or glycerin, which is able to produce a visible vapor. The vaporisable liquid may further comprise other substances such as nicotine and flavorings. The reservoir 8 may have an annular shape, formed around a central airflow bore 9 that extends from an atomiser 20 to the mouthpiece 6. The mouthpiece 6 has a vapour outlet 30 and may have a tip-shaped form to correspond to the ergonomics of the user's mouth.

The power supply portion 3b of the electronic cigarette 2 includes a power source 4, such as a battery 4, an electronic control circuitry 5 configured to control the operation of the electronic cigarette 2, and a light source 14. The light source 14 can for instance be a laser 14 or a high power LED. The light source 14 is electrically connected to the battery 4. In an embodiment, laser diodes may be provided. These are chosen because they can provide high efficiency within a compact size. Typical wavelengths for the emitted light range from 785 nm to 1064 nm. Multimode lasers are preferred because they can provide a higher power output and are typically available at a lower cost. However, single mode lasers could also be used.

As an alternative to a laser it is possible to use a light emitting diode (LED). High power LEDs are known at near infra-red (850 nm) and ultraviolet (405 nm). LEDs typically require the addition of optical components for beam shaping to deal with their wide emission angles in comparison to lasers.

Figure 1:
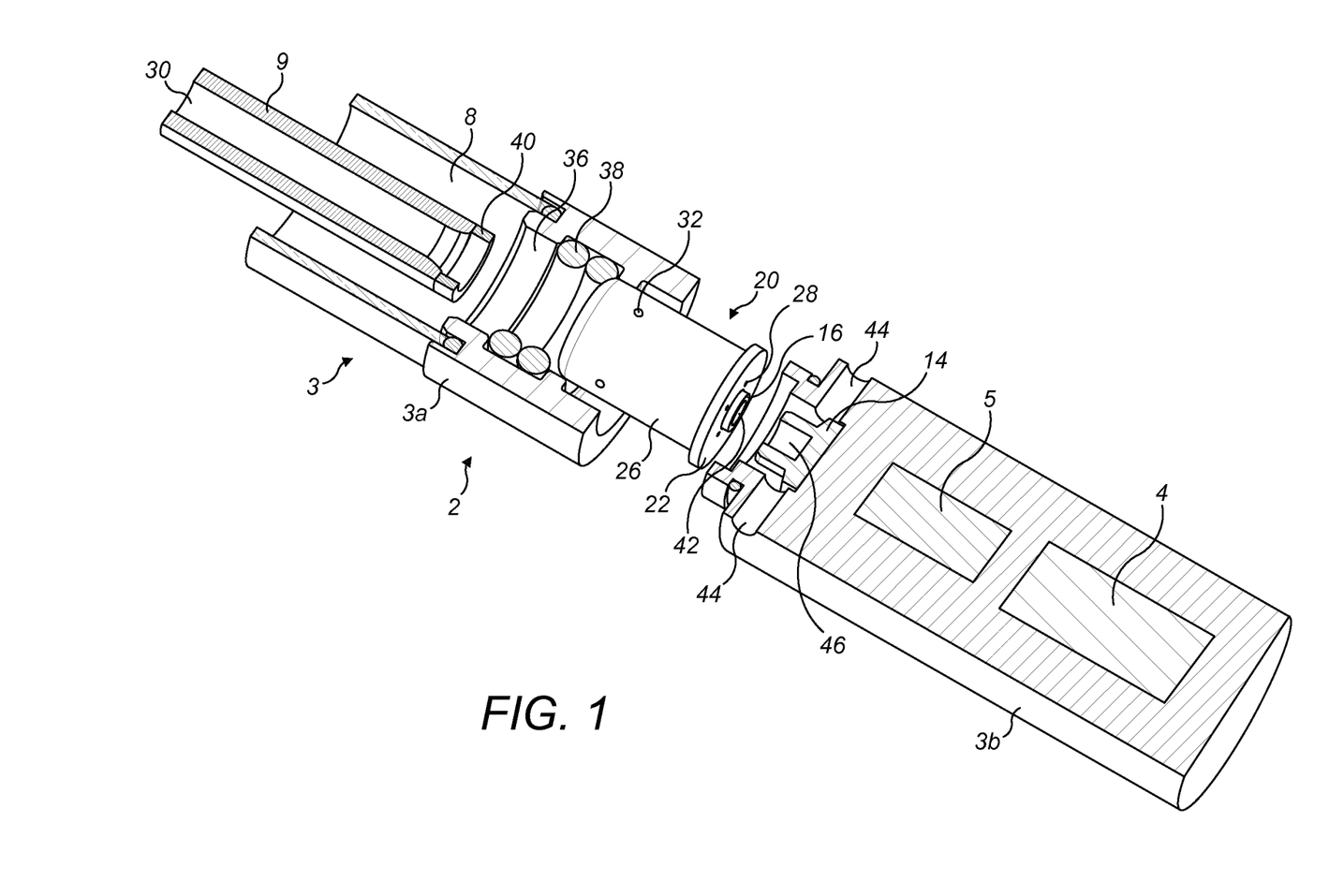
FIG. 1 is an exploded view of a portion of an electronic cigarette in an embodiment of the invention.
Figure 2:
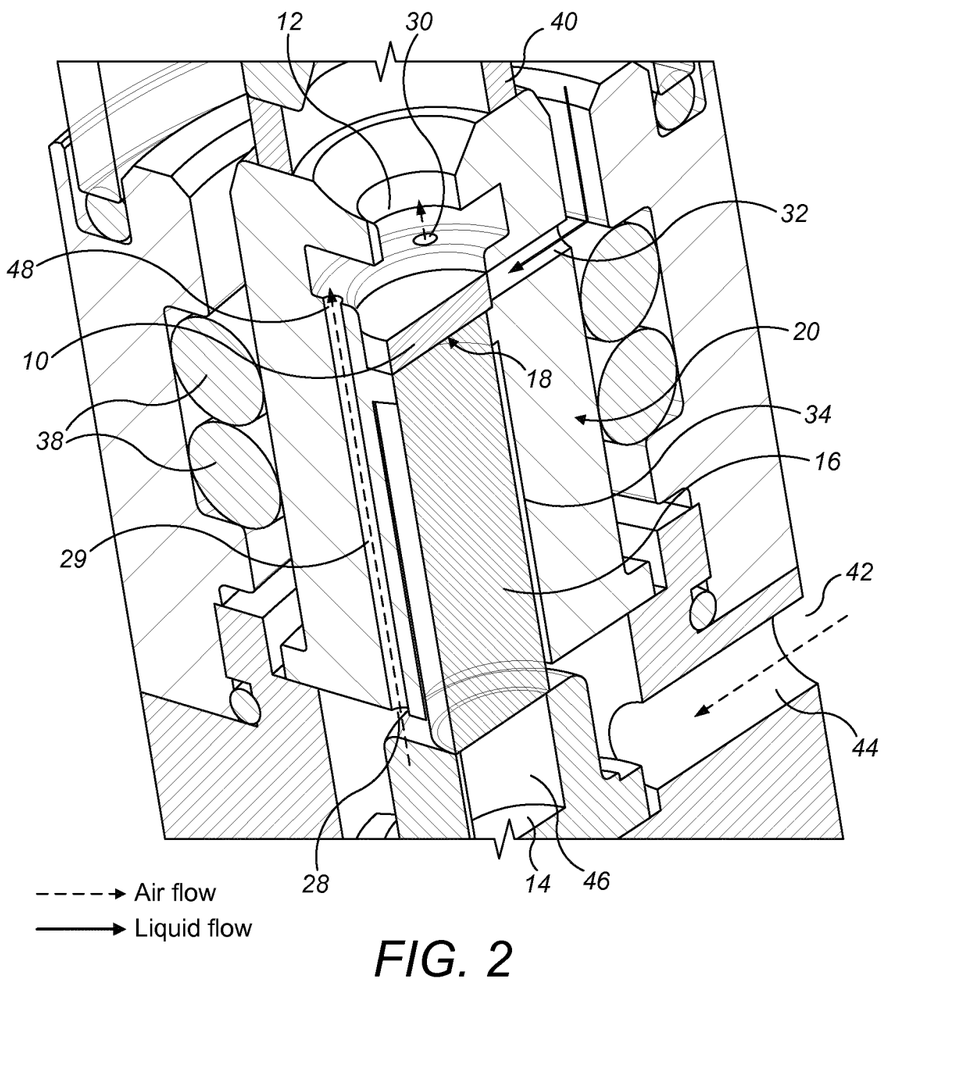
FIG. 2 is a cross-sectional view of the atomiser and a portion of the electronic cigarette shown in FIG. 1, in an assembled form.

The atomiser 20 is arranged to be replaceable within the electronic cigarette 2. In use, the atomiser 20 is received within a receiving portion 36 in the mouthpiece portion 3a.

The replaceable atomiser 20 is shaped as a cartridge having an external housing 26 a light guide 16, an absorber 10 and a vaporization chamber 12. The external housing 26 is preferably formed as a unitary component. The material of the housing may for instance be metal, glass or plastic that is easy to shape as a single unit.

The atomizer housing 26 comprises a lower base 22 and a top 24 that are preferably arranged essentially perpendicular to the axial extension of the atomizer 20. The top 24 is configured to couple to the reservoir 8. The lower base 22 is configured to couple to the light source 14.

The vaporization chamber 12 is preferably located in the proximity of the top 24 and is fluidically connected to the reservoir 8. Hence, liquid in the reservoir 8 can flow towards the absorber 10 when the atomiser 20 is fully inserted in the receiving portion 36. The vaporisable liquid may be arranged to flow towards the absorber 10 by capillary effects. Gravity may also encourage the flow of vaporisable liquid and/or a pump (not shown) may be present.

The absorber 10 is provided within a vaporisation chamber 12 above an end face 18 of the light guide 16. The absorber 10 is also positioned adjacent the liquid inlets 32 so that it can receive a flow of vaporisable liquid from the reservoir 8. The absorber 10 can perform two independent functions in this arrangement. First, the absorber 10 can absorb the liquid from the reservoir 8. Second, the absorber 10 can absorb radiation emitted by the laser 14 so that the material of the absorber 10 is heated. Heat can be transferred from the absorber 10 to the vaporisable liquid so that it is vaporised. A absorber 10 such as a metal mesh or a porous metal disk may be provided with light absorption properties, but without liquid absorption properties.

Figure 4:
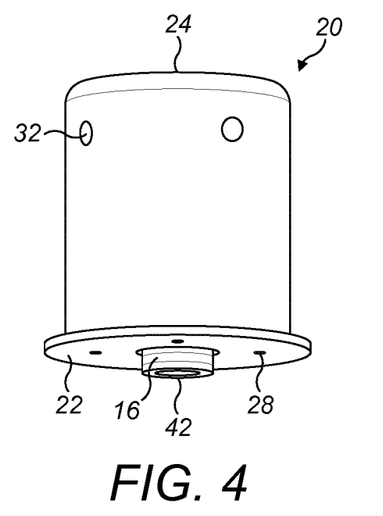
FIG. 4 is a schematic view of an atomiser for use in an electronic cigarette in an embodiment of the invention.

As best seen in FIGS. 1, 2 and 4, the atomizer 20 further comprises air channels 29 extending between air inlets 28 located in the lower base 22 and air outlets or holes 48 located in the vaporization chamber 12. Preferably, the at least one air outlet 48 in the vaporization chamber 12 is located above the absorber. Air inlets 28 are provided in the base 22 of the atomiser 20 and a vapour outlet 30 is provided as a central hole in the top 24 of the atomizer 12.

The atomiser 20 includes a central bore 34 in which the light guide 16 is accommodated. The light guide 16 is made of an optically transparent material such as glass, which has a refractive index of around 1.5. The light guide 16 is arranged with a projection 42 that extends slightly from the base 22 of the atomiser 20.

The light guide 16 has an axial direction which is coinciding with an axial direction of the atomizer housing 26. The light guide 16 has an upper coupling surface 18a and a lower coupling surface 18b, wherein the lower coupling surface 18b is configured to couple with the light source 16 and the upper coupling surface 18a is configured to couple with the absorber 10. The upper coupling surface 18a of the light guide 16 effectively seals the base of the vaporisation chamber 12 within the atomiser 20. Preferably, the light guide 16 has an elongate cylindrical shape.

The projection 42 of the light guide 16 that extends from the lower base 22 of the atomiser 20 is received in a receiving portion 46 of the light source 14, or the package within which the laser 14 is provided. This creates a plug-fit between the laser 14 and the light guide 16 to ensure that all of the light from the laser 14 is effectively coupled into the light guide 16.

As best seen in FIGS. 1, 2 and 5-7, the receiving portion 36 of the electronic cigarette 2 has a shape that preferably corresponds to the circumferal shape of the atomizer 20. If the atomizer 20 is cylindrical, the receiving portion 36 is preferably tubular cylindrical. The atomizer 20 can be held snugly within the receiving portion 36 by a friction fit. Alternatively, a screw fit between the atomizer and the receiving portion 36 can provide a fixed attachment therebetween.

The mouthpiece portion 3a of the electronic cigarette 2 is arranged to be attached directly to the power supply portion 3b by means of a threaded connection, a bayonet connection or some other means. When the mouthpiece portion 3a and the power supply portion 3b are connected, the atomiser 20 is clamped into the receiving portion 36.

Figure 3:
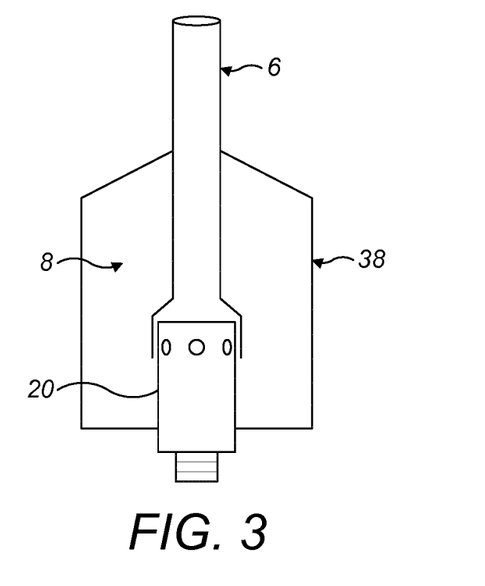
FIG. 3 is a schematic view of the connection between the liquid store and the atomiser in an embodiment of the invention.

Preferably, the atomiser 20 is sealed against an inner circumferential surface of the receiving portion 36. To this effect, a circular annular seal 38 can be provided and is configured to only enable liquid to flow from the liquid store 8 to the liquid inlets 32. The annular seal 38 thus prevents liquid from leaking into the receiving portion 36 and along the atomizer housing 26. At least one annular seal 38 can be provided on the inner circumference of the receiving portion 36. The annular seal 38 can be provided as at least one O-ring. On the atomizer 20, the liquid inlets 32 are provided circumferentially around a side surface of the atomiser 20 at a position that is above the seals 38 when the atomizer 20 is located inside the electronic cigarette 2. Preferably, the liquid inlets 32 are located closer to the top surface 24 than the base 22 of the atomizer 20.

The inner seal 38 may be configured to also provide a friction fit. The at least one sealing O-ring 38 is provided at a position below the liquid inlets 32. Thus, the liquid inlets 32 can be arranged in fluid communication with the liquid in the reservoir 8 when the atomiser 20 is fully received in the receiving portion 36. In this configuration the top 24 of the atomiser 20 is provided against an abutment 40 at the base of a central bore that extends from the atomiser 20 to the mouthpiece 6.

An airflow path is provided between an air inlet 44 in the electronic cigarette 2 and the mouthpiece 6. A user can apply suction to the mouthpiece 6 and this can draw air into the device through the air inlet 44. The airflow path extends past the laser 14. In this way, the laser 14 can heat the airflow before it is received by the atomiser 20. This can pre-heat air from the environment before it is received in the atomiser 20 and this can reduce the amount of energy required for vaporisation. Additionally, this can provide a desirable cooling effect for the laser 14.

The airflow is received in the atomiser 20 through air inlets 28 that are disposed around the projection 42 of the light guide 16 in the base 22. Air then flows within the atomiser 20 towards the vaporisation chamber 12 in a direction that is generally parallel to the longitudinal axis of the light guide 16. Air holes 48 are provided in the vaporisation chamber 12 and a central vapour outlet 30 is provided in the top of the vaporisation chamber 12.

In use, light is emitted by the laser 14. The laser light is received within the transparent light guide 16 and propagates towards the absorber 10. The absorber 10 absorbs light from the laser 10 and generates heat. Simultaneously the absorber 10 receives vaporisable liquid from the reservoir 8 through the liquid inlets 32. The liquid in the absorber 10 is vaporised due to the heat generated by the laser light. Vapour generated in the vaporisation chamber 12 is carried in the airflow out of the central vapour outlet 30 in the atomiser 20 and towards the mouthpiece 6 so that it can be inhaled by a user.

When the atomiser 20 is to be replaced, the mouthpiece portion 3a and the power supply portion 3b are disconnected. The spent atomiser 20 can then be removed by hand. A new atomiser 20 can then be inserted in its place. This operation ensures that the light guide 16 within the atomiser 20 is aligned automatically with the laser 14. The absorber 10 is integrated within the atomiser 20, together with the light guide 16, so there is no risk of damage being done by one of these components to the other during a replacement operation. Replacement of the atomiser 20 may be desirable if the absorber 10 becomes degraded. Replacement of the atomiser 20 may also be desirable if the end face 18 of the light guide 16 becomes coated in materials that affect its ability to couple light from the laser 14 towards the absorber 10.

In the embodiments described in relation to FIGS. 1 to 7, the light guide 16 can be provided with a cylindrical projection 42 having a flat end face.

Figure 8A:
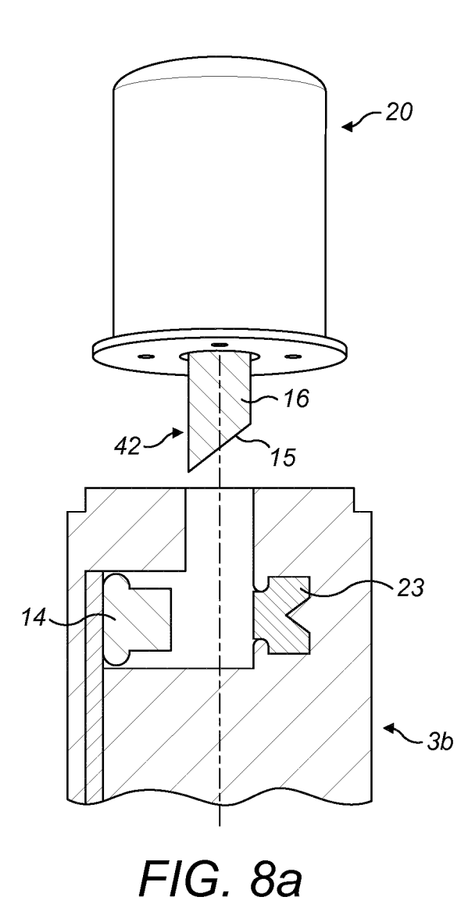
FIG. 8a is a schematic view of a replaceable cartridge and a power supply portion of an electronic cigarette.

However, as illustrated in FIG. 8a it is also possible to provide the light guide 16 with a projection 42 having a tapered end. Hence, an angled reflection surface 15 is provided at the lower end of the light guide 16 at an angle of approximately 45 degrees to the longitudinal axis of the electronic cigarette 2.

As illustrated in FIG. 8a, the light source which is a laser 14 is located in a cavity in the power supply portion 3b and is configured to emit light in a direction transverse to the longitudinal direction of the electronic cigarette 2. The power supply portion 3b further comprises a beam dump 23 that is configured to absorb emitted radiation when the light guide 16 is absent.

In use, light is emitted by the laser 14. The laser light is received within the transparent light guide 16 and reflected by the angled reflection surface 15 towards the absorber 10. Radiation from the laser 14 is reflected by the angled reflection surface to be re-directed in a direction that is parallel to the longitudinal axis of the electronic cigarette 2. In this way, the light guide 16 can direct radiation emitted by the laser 14 towards the absorber 10 and vaporize the liquid as previously described.

When the atomizer 20 or cartridge is disassembled from the power supply portion 3b, the laser 14 is pointed towards the beam dump 23 that is configured to absorb emitted radiation. If the laser 14 is operated in the absence of any connected cartridge 20 the emitted radiation can be safely absorbed. There is no path that would allow potentially harmful radiation emitted by the laser 14 to be encountered by a user.

Hence, the laser 14 is configured to emit light in a direction that is not aligned with the longitudinal axis of the electronic cigarette 2. This advantageously improves safety of the electronic cigarette 2. In this sense, the light guide 16 can function as an enabling device adapted to enable propagation of radiation from the laser 14 to the absorber 10 when the cartridge 20 is assembled to the main body 4 and to inhibit propagation of radiation from the laser 14 to the absorber 10 when the cartridge 20 is disassembled from the main body 4.

Figure 8B:
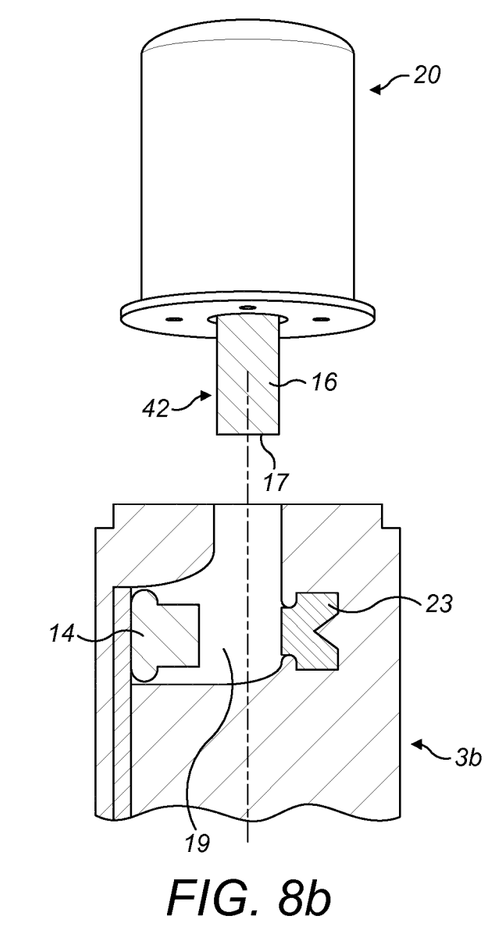
FIG. 8b is another schematic view of a replaceable cartridge and a power supply portion of an electronic cigarette.

Additionally or alternatively, as illustrated in FIG. 8b, the light guide 16 can be made of a transparent and flexible material such that a coupling end 17 can be guided and positioned in a direction that is different from the axial direction of the electronic cigarette 2. This can for instance be achieved by providing a guiding slot 19 in the power supply portion 3b which is configured to guide the coupling end 17 to the laser 14 which emits light in a transverse direction in relation to the longitudinal direction of the electronic cigarette 2. The guiding slot 19 is curved and can guide the coupling end 17 of the flexible light guide 16 through 90° as it is assembled to the power supply portion 3b.

Figure 9:
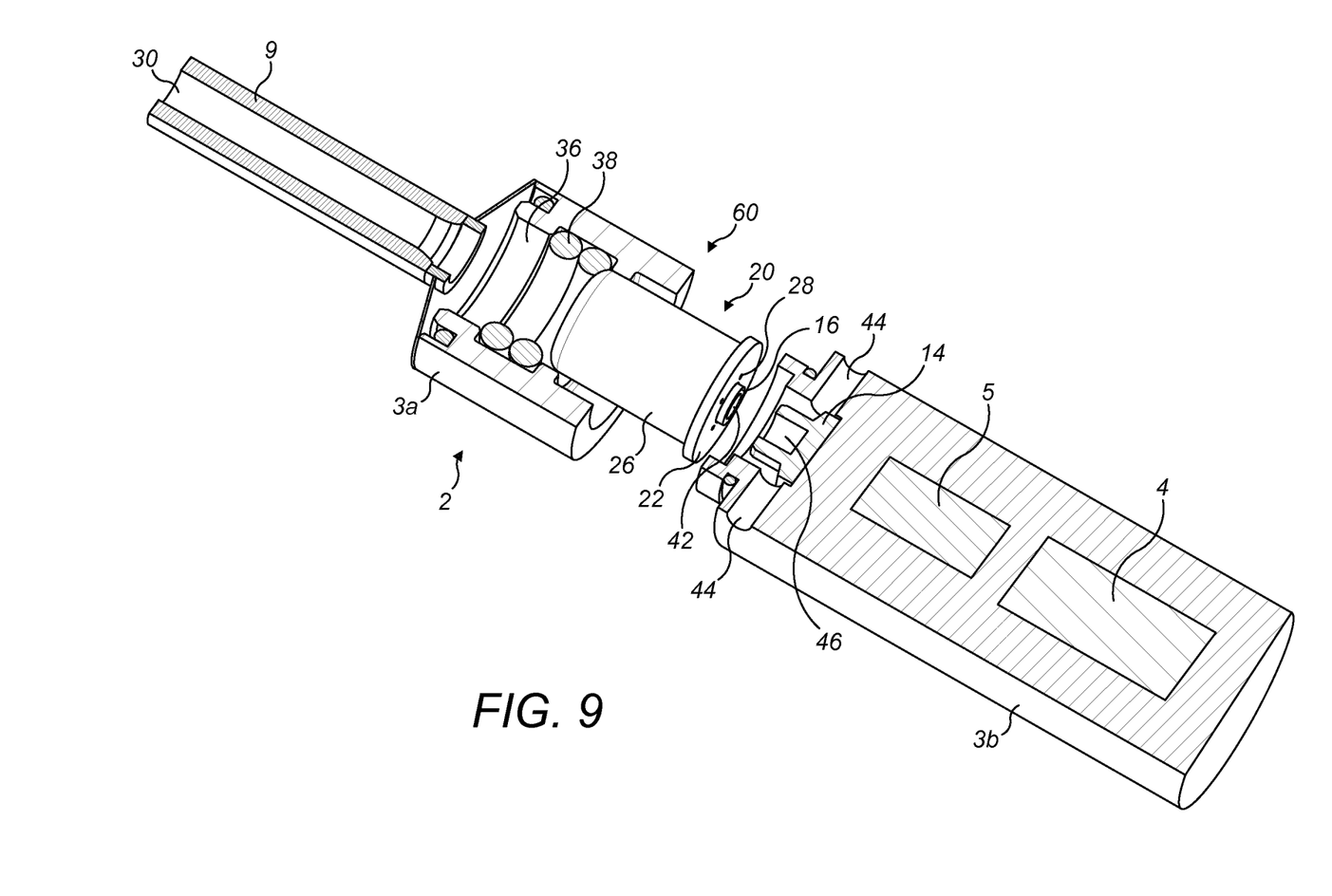
FIG. 9 is an exploded view of a portion of an electronic cigarette in another embodiment of the invention.

As illustrated in the embodiment of FIG. 9, the mouthpiece portion 3a of the electronic cigarette 2 can exclude the refillable liquid store or reservoir 8. In this embodiment a reservoir (not shown) can be integrated within a replaceable cartridge 60 which comprises a liquid to be vaporized. In addition to a reservoir the replaceable cartridge 60 includes the atomiser 20 as described above in relation to FIGS. 1 to 8.

Figure 10A:
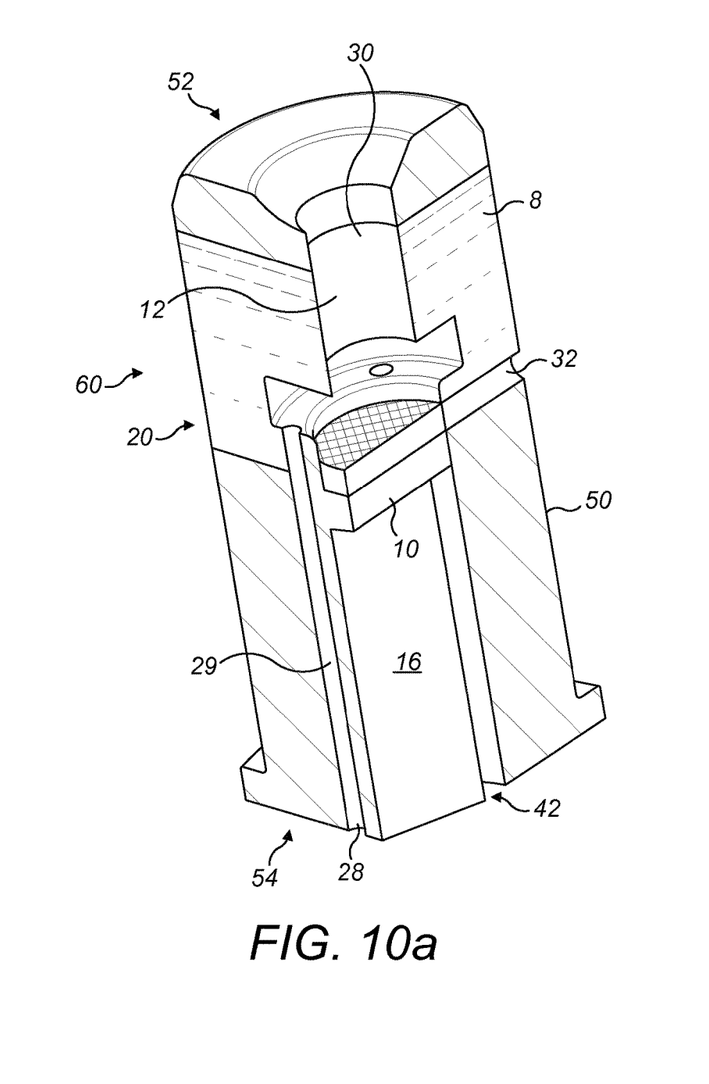
FIG. 10a is a cross sectional view of a replaceable cartridge and a portion of an electronic cigarette in an embodiment of the invention.
Figure 10B:
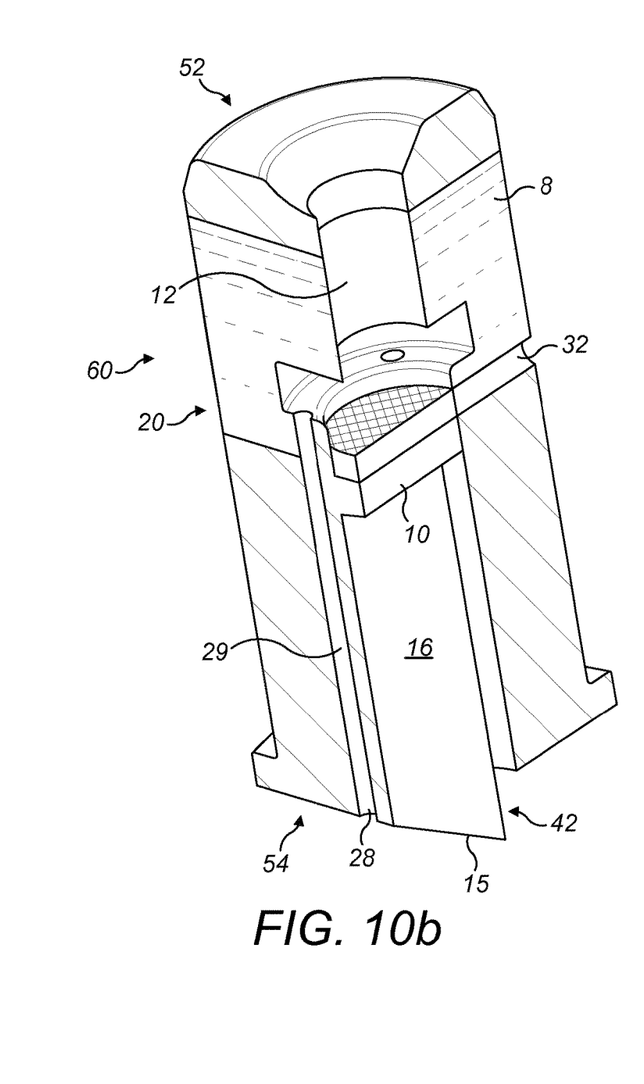
FIG. 10b is a cross sectional view of a replaceable cartridge and a portion of an electronic cigarette in another embodiment of the invention.

As illustrated in FIGS. 10a and 10b, the cartridge 60 comprises a housing 50 enclosing the vaporisation chamber 12 as previously described in connection with FIGS. 1 to 8. The housing 50 further includes a mouthpiece coupling end 52 configured to abut against the mouthpiece portion 3a and a laser coupling end 54 configured to connect with the laser 14 in the power supply portion 3b.

The mouthpiece coupling end 52 enables the vapor outlet 30 to create a vapor flow channel extending from the vaporization chamber 12 in the cartridge 60 to the mouthpiece 6. The mouthpiece coupling end 52 may be provided with a seal to ensure that the vapour is diverted directly into the mouthpiece 6.

A liquid reservoir 8 is integrated within the cartridge 60, and is located at the mouthpiece coupling end 52 of the cartridge 60. Hence, the liquid reservoir 8 is located above the absorber 10 such that the liquid can be transferred by gravity to the absorber 10. The cartridge 60 comprises an atomizer 20 as previously described in connection with FIGS. 1 to 8. The atomizer 20 thus comprises a light guide 16 received within the housing 50, an optical absorber 10 received within the housing and a vaporisation chamber 12 received within the housing. A liquid flow path is provided from the liquid inlet 32 preferably located in the bottom of the liquid reservoir 8 and towards the optical absorber 10. An air flow path can also be provided in a similar arrangement as described in relation to FIG. 2 with air inlets 28 in the base of the atomiser 20 and airflow channels 29 extending in the longitudinal axis of the electronic cigarette 2. As seen in FIG. 10b, the light guide 16 can be provided with a projection 42 which may also have an angled coupling surface 15. The light guide 16 may also be provided in a flexible material such that it can be guided to a light source 14.

A number of materials may be chosen for use in the absorber 10. In general the material of the absorber 10 is chosen as a radiation absorber for laser light. The laser light can be absorbed by the laser light in the absorber 10 and this can cause heating which vaporises the vaporisable liquid. The vaporisable liquid is generally optically transparent. In one example, as shown in FIG. 2, the absorber 10 is provided as a porous metal disk.

Figure 5:
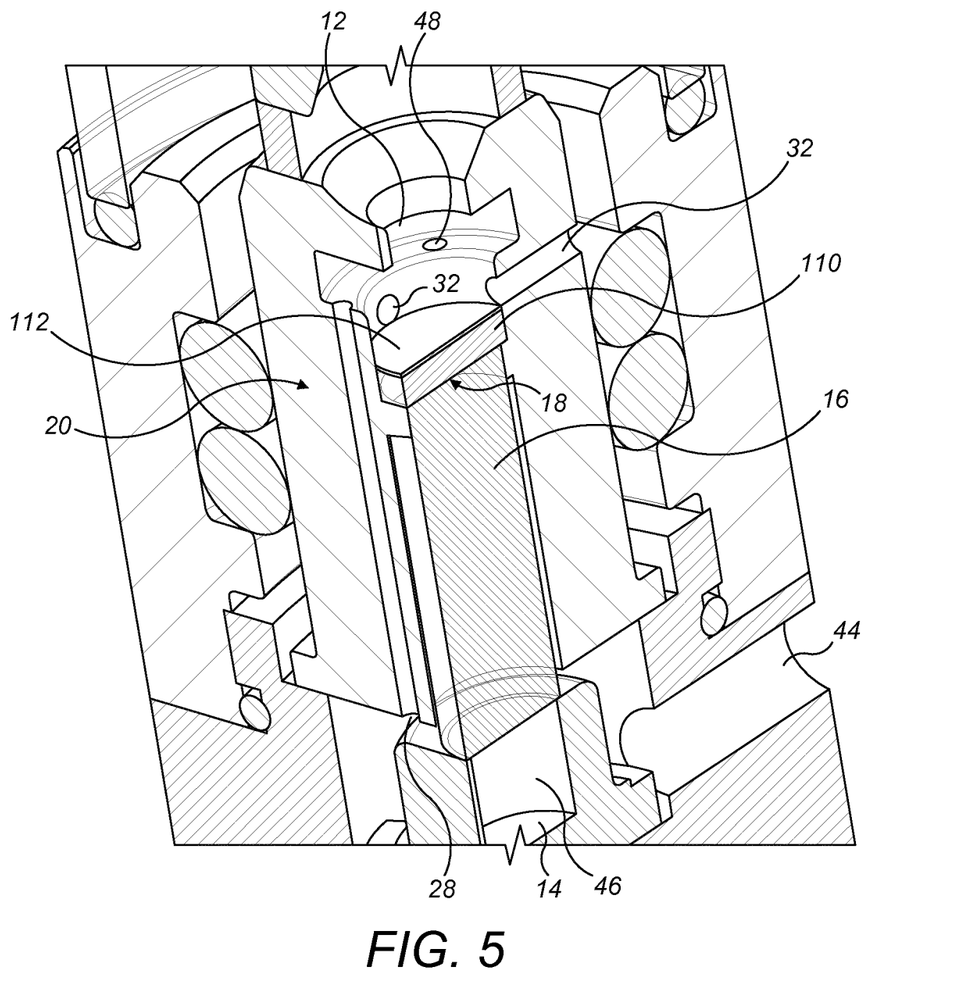
FIG. 5 is a cross sectional view of an atomiser and a portion of an electronic cigarette in another embodiment of the invention.

FIG. 5 is a cross-sectional view of an electronic cigarette 2 in another embodiment of the invention where a absorber is formed on a glass plate 110 provided adjacent the end face 18 of the light guide 16. The glass plate 110 includes a coating 112 that is light absorbing for the radiation emitted by the laser 14. In this arrangement the vaporisable liquid is delivered to the vaporisation chamber 12 by the capillary liquid inlets 32. The user's suction on the mouthpiece 6 can lower the pressure in the vaporisation chamber 12 to stimulate the flow of liquid. When the vaporisable liquid arrives in the vaporisation chamber 12 it can pool on the surface of the coating 112 which is then heated by the light from the laser 14. The glass plate 110 is heat resistant and has a lower thermal conductivity than the vaporisable liquid, which results in an efficient transfer of heat to the liquid from the coating 112. In an alternative arrangement the coating 112 may be applied directly on the end face 18 of the light guide so that there is no need for a separate glass plate 110.

Figure 6:
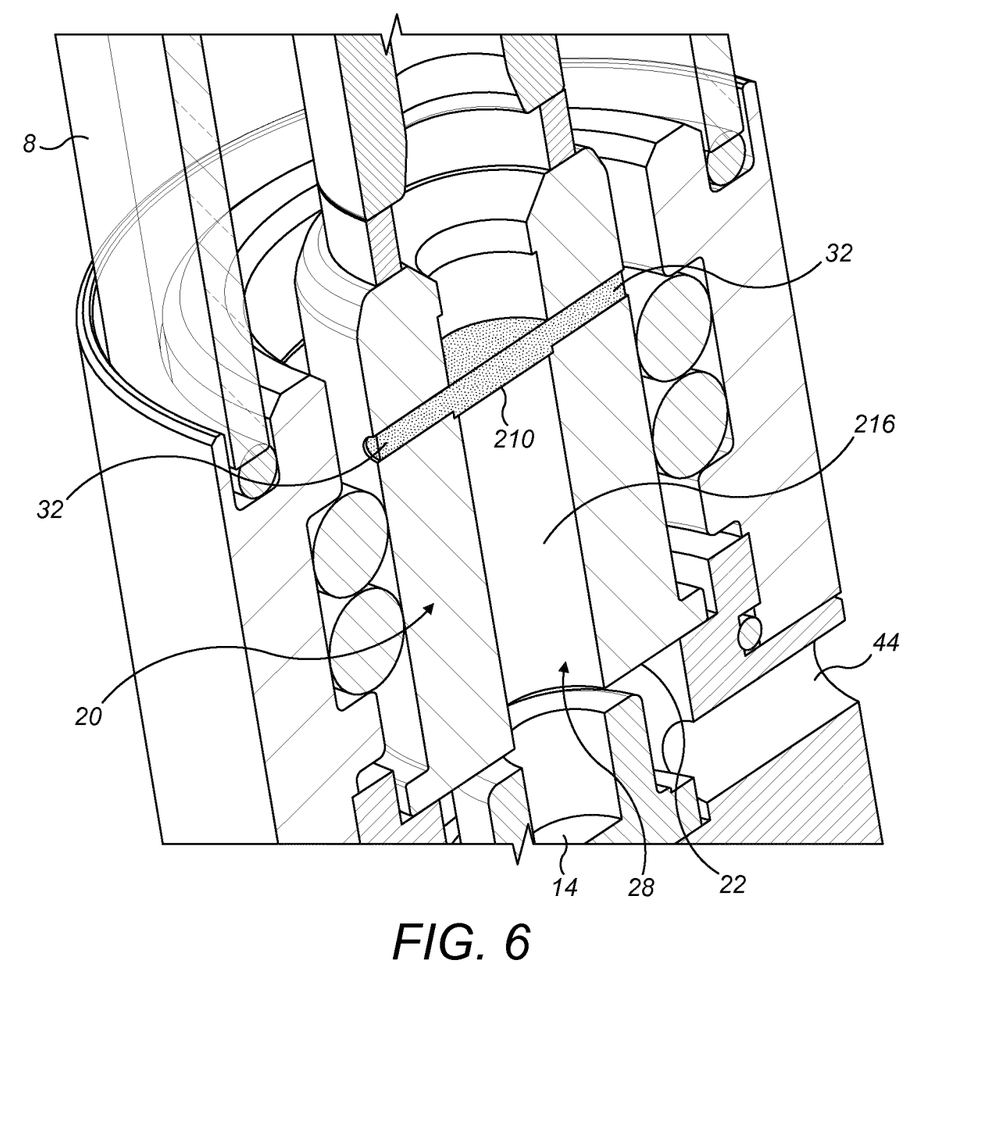
FIG. 6 is a cross sectional view of an atomiser and a portion of an electronic cigarette in another embodiment of the invention.

FIG. 6 is a cross-sectional view of an electronic cigarette 2 in another embodiment of the invention where a absorber is formed of Kevlar fibre 210. In this arrangement the Kevlar fibre 210 extends into the liquid inlets 32 to promote the flow of liquid from the reservoir 8. The light guide 216 is provided in free-air between the laser 14 and the Kevlar fibre 210. The light guide 216 is a cylinder having a reflective inner surface to couple light from the laser 14 towards the Kevlar fibre 210. In this arrangement the central bore of the light guide 216 is also the main airflow channel within the atomiser 20. Thus, the base of the central bore is an air inlet 28 in the base 22 of the atomiser 20. The Kevlar fibre 210 can be provided with integrated air-holes (not shown) to promote air flow towards the mouthpiece 6. This may be helpful when the Kevlar fibre 210 is saturated with liquid.

Figure 7:
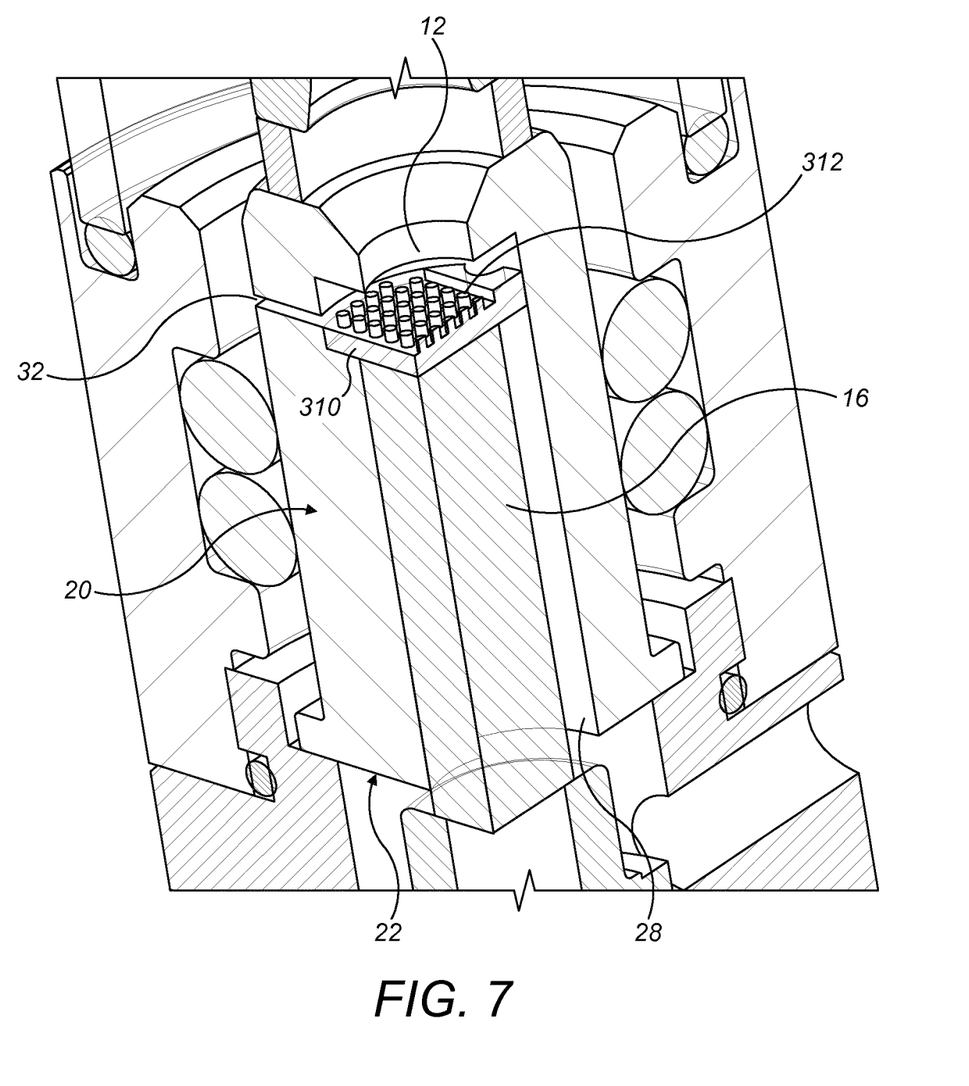
FIG. 7 is a cross sectional view of an atomiser and a portion of an electronic cigarette in yet another embodiment of the invention.

FIG. 7 is a cross-sectional view of an electronic cigarette 2 in yet another embodiment of the invention. This is a modified version of the embodiment shown in FIG. 5 in which the coating 312 on the glass plate 310 is formed as a forest of micro structures. The micro structures can provide high capillary forces that can promote the flow of liquid through the liquid inlets 32 towards the vaporisation chamber 12. In this embodiment the atomiser 20 includes an air inlet 28 in the base 22 that is directly adjacent the light guide 16. Channels are cut into the glass plate 310 to provide the necessary airflow from the air inlet 28 to the vaporisation chamber 12.

In other embodiments the absorber 10 could be formed of other light absorbing porous materials such as cotton or porous ceramic with an integrated absorber.

The invention claimed is:

1. An atomiser for an electronic cigarette, comprising:
   a housing including at least one air inlet, at least one air outlet and a liquid inlet;
   a light guide extending into the housing;
   an optical absorber within the housing; and
   a vaporisation chamber within the housing, wherein a liquid flow path is provided from the liquid inlet towards the optical absorber and the vaporisation chamber, and an air flow path is defined from the at least one air inlet in the housing to the vaporization chamber, and wherein the light guide is configured to couple light from a vaporising light source towards the optical absorber which can generate heat by absorbing light from the vaporising light source,
   wherein the optical absorber includes a liquid absorber for absorbing vaporisable liquid received in the liquid inlet, and
   wherein the optical absorber is provided within the vaporization chamber axially above an end face of the light guide with respect to an axial direction of the housing.

2. The atomiser of claim 1, wherein the light guide is a solid prism that light from the vaporising light source can propagate within.

3. The atomiser of claim 1, wherein light guide has an upper coupling surface and a lower coupling surface, wherein the lower coupling surface is configured to couple with the vaporising light source and the upper coupling surface is configured to couple with the optical absorber.

4. The atomiser of claim 3, wherein the lower coupling surface is angled such that the lower coupling surface can receive a light beam in a transverse direction and redirect said light beam into an axial direction.

5. The atomiser of claim 3, wherein the lower coupling surface is configured to engage with a receiving portion of the vaporising light source.

6. The atomiser of claim 5, wherein the lower coupling surface is formed on a projection extending from the housing.

7. The atomiser of claim 1, wherein the at least one air outlet is located axially above the optical absorber in the vaporization chamber.

8. The atomiser according to claim 1, wherein the vaporising light source is a laser.

9. A cartridge comprising a liquid store and the atomiser of claim 1.

10. The cartridge of claim 9, wherein the vaporising light source is a laser.

11. An electronic cigarette device comprising a mouthpiece portion and a power supply portion, wherein the mouthpiece portion comprises:
   a liquid store,
   a receiving portion configured to receive a removable atomiser, and
   a mouthpiece having a vapor outlet channel,
   and wherein the power supply portion comprises:
   a power source; and
   a vaporising light source configured to receive electrical energy from the power source, wherein the vaporising light source is configured to couple light to a light guide located within the atomiser.

12. The electronic cigarette device according to claim 11, wherein the vaporising light source is housed within a recessed portion of the receiving portion, the recessed portion configured to receive a protruding portion of the light guide.

13. The electronic cigarette device according to claim 11, wherein the mouthpiece portion further comprises at least one seal positioned around an internal circumference of the receiving portion.

14. The electronic cigarette device of claim 11, further comprising an airflow channel provided between an air inlet and the mouthpiece, wherein the vaporising light source is provided in or adjacent the airflow channel at a position between a location of the receiving portion configured to receive the atomiser and the air inlet so that the airflow can be heated by the vaporising light source.

15. The electronic cigarette device according to claim 11, wherein the vaporising light source is a laser.

16. The electronic cigarette device according to claim 11, wherein the mouthpiece portion further comprises an optical absorber configured to absorb radiation emitted by the vaporising light source.

17. A method of operating an electronic cigarette, comprising the steps of:
   providing an atomiser comprising:
      a housing including at least one air inlet, at least one air outlet and a liquid inlet;
      a light guide;
      an optical absorber; and
      a vaporisation chamber received within the housing;
   providing a vaporising light source and a liquid reservoir separately from the atomiser;
   providing a flow of vaporisable liquid from the liquid reservoir towards the optical absorber and the vaporisation chamber;
   providing vaporising light from the vaposing light source;
   coupling the vaporising light from the vaporising light source towards the optical absorber using the light guide; and
   absorbing the light at the optical absorber in order to generate heat and vaporise the vaporisable liquid,
   wherein the optical absorber includes a liquid absorber for absorbing vaporisable liquid received in the liquid inlet, and
   wherein the optical absorber is provided within the vaporization chamber axially above an end face of the light guide with respect to an axial direction of the housing.

18. The method of claim 17, further comprising the step of replacing the atomiser.

\* \* \* \* \*